US011687827B2

(12) United States Patent
Pondicherry Murugappan et al.

(10) Patent No.: US 11,687,827 B2
(45) Date of Patent: Jun. 27, 2023

(54) ARTIFICIAL INTELLIGENCE (AI)-BASED REGULATORY DATA PROCESSING SYSTEM

(71) Applicant: ACCENTURE GLOBAL SOLUTIONS LIMITED, Dublin (IE)

(72) Inventors: Ramkumar Pondicherry Murugappan, Bangalore (IN); Ashwinee Godbole, Pune (IN)

(73) Assignee: ACCENTURE GLOBAL SOLUTIONS LIMITED, Dublin (IE)

( * ) Notice: Subject to any disclaimer, the term of this patent is extended or adjusted under 35 U.S.C. 154(b) by 771 days.

(21) Appl. No.: 16/592,370

(22) Filed: Oct. 3, 2019

(65) Prior Publication Data
US 2020/0111023 A1 Apr. 9, 2020

(30) Foreign Application Priority Data
Oct. 4, 2018 (IN) .............................. 201811037572

(51) Int. Cl.
*G06N 20/00* (2019.01)
*G06N 5/02* (2006.01)
(Continued)

(52) U.S. Cl.
CPC ............ *G06N 20/00* (2019.01); *G06F 40/295* (2020.01); *G06F 40/30* (2020.01); *G06N 5/02* (2013.01); *G06F 3/0484* (2013.01)

(58) Field of Classification Search
CPC ........ G06N 20/00; G06N 5/02; G06F 40/295; G06F 40/30

(Continued)

(56) References Cited

U.S. PATENT DOCUMENTS

2004/0205461 A1* 10/2004 Kaufman .............. G06F 40/258
715/255
2010/0145678 A1* 6/2010 Csomai ................. G06F 40/169
704/10

(Continued)

OTHER PUBLICATIONS

John Lafferty, et al., "Conditional random fields: Probabilistic models for segmenting and labeling sequence data," Int'l Conf. on Machine Learning (ICML), pp. 282-289, 2001 (Year: 2001).*

(Continued)

*Primary Examiner* — Stephen S Hong
*Assistant Examiner* — Broderick C Anderson
(74) *Attorney, Agent, or Firm* — Mannava & Kang, P.C.

(57) ABSTRACT

An Artificial Intelligence (AI)-based regulatory data processing system accesses a regulatory text corpus for training machine learning (ML) models including a topic extraction model, a feature selection model, an entity identification model and a section classification model. The regulatory text corpus includes documents pertaining to a specific domain corresponding to a received domain-specific regulatory text document. Various trained machine learning (ML) models are used to extract topics, identify entities from the new regulatory document and to classify portions of the domain-specific regulatory text document into one of a plurality of predetermined sections. The information in the new regulatory document is therefore converted into machine consumable form which can facilitate automatic execution of downstream processes such as identification of actions needed to implement the regulations and robotic process automation (RPA).

19 Claims, 14 Drawing Sheets

(51) Int. Cl.
*G06F 40/30* (2020.01)
*G06F 40/295* (2020.01)
*G06F 3/0484* (2022.01)

(58) Field of Classification Search
USPC .......................................................... 706/11
See application file for complete search history.

(56) References Cited

U.S. PATENT DOCUMENTS

| | | | | |
|---|---|---|---|---|
| 2013/0297626 | A1* | 11/2013 | Levi ..................... | G06F 16/345 |
| | | | | 707/754 |
| 2014/0164297 | A1* | 6/2014 | Deolalikar ............. | G06N 20/10 |
| | | | | 706/12 |
| 2016/0103823 | A1* | 4/2016 | Jackson, Jr. ........... | G06N 5/025 |
| | | | | 704/9 |
| 2016/0337295 | A1* | 11/2016 | Bennett .................. | H04L 51/18 |
| 2017/0300565 | A1* | 10/2017 | Calapodescu .......... | G06F 16/93 |
| 2018/0053128 | A1* | 2/2018 | Costas ................... | G06Q 50/18 |
| 2019/0026634 | A1* | 1/2019 | Homeyer ................ | G06N 5/04 |
| 2020/0065857 | A1* | 2/2020 | Lagi ...................... | G06Q 30/0269 |

OTHER PUBLICATIONS

Rachel Woloszynski, "Regulatory Compliance in the Age of Artificial Intelligence", Jun. 27, 2018, 6 pages.
Mike MacDonagh, "Insights: How AI has the potential to transform Regulatory Compliance", Sep. 6, 2016, 4 pages.

* cited by examiner

ML_PREDICTION OUTPUT (HTML)

PROVISIONS LIMITING THE USE OF INFORMATION EXCHANGED UNDER THE CONVENTION NOW THEREFORE THE PARTIES HAVE AGREED AS FOLLOWS 2 ARTICLE 1 DEFINITIONS 1c) THE TERM [IRS GOVERNMENT BODY] MEANS THE U.S INTERNAL REVENUE SERVICE) THE TERM PARTNER JURISDICTION MEANS A JURISDICTION THAT HAS IN EFFECT AN AGREEMENT WITH THE UNITED STATES TO FACILITATE THE IMPLENTATION OF [FACTA REGULATORY TERM] THE [IRS GOVERNMENT BODY] SHALL PUBLISH A LIST IDENTIFYING ALL PARTNER JURISDICTIONSG) THE TERM FINANCIAL INSTITUTION MEANS A CUSTODIAL INSTITUTION A [DEPOSITORY INSTITUTION FINANCIAL ENTITY] AN INVESTMENT ENTITY OR A SPECIFIED INSURANCE COMPANYG) THE TERM FINANCIAL INSTITUTION MEANS A CUSTODIAL INSTITUTION A DEPOSITORY INSTITUTION AN [INVESTMENT ENTITY FINANCIAL ENTITY] OR A SPECIFIED INSURANCE COMPANYG) THE TERM FINANCIAL INSTITUTION MEANS A CUSTODIAL INSTITUTION A DESPOSITORY INSTITUTION AN INVESTMENT ENTITY OR A [SPECIFIED INSURANCE COMPANY FINANCIAL ENTITY]) THE TERM [DEPOSITORY INSTITUTION FINANCIAL ENTITY] MEANS ANY ENTITY THAT ACCEPTS DEPOSITS IN THE ORDINARY COURSE OF A BANKING OR SIMILAR BUSINESSJ) THE TERM [INVESTMENT ENTITY FINANCIAL ENTITY] MEANS ANY ENTITY THAT CONDUCTS AS A BUSINESS (OR IS MANAGED BY AN ENTITY THAT CONDUCTS AS A BUSINESS) ONE OR MORE OF THE FOLLOWING ACTIVITIES OR OPERATIONS FOR OR ON BEHALF OF A CUSTOMER (1) TRADING IN MONEY MARKET INSTRUMENTS (CHEQUES BILLS CERTIFICATES OF DEPOSIT DERIVATIVES ETC.) FOREIGN EXCHANGE EXCHANGE INTEREST RATE 3 AND INDEX INSTRUMENTS TRANSFERABLE SECURITIES OR COMMODITY FUTURES TRADING (2) INDIVIDUAL AND COLLECTIVE PORTFOLIO MANAGEMENT OR (3) OTHERWISE INVESTING ADMINISTERING OR MANAGING FUNDS OR MONEY ON BEHALF OF OTHER PERSONSJ) THE TERM INVESTMENT ENTITY MEANS ANY ENTITY THAT CONDUCTS AS A BUSINESS (OR IS MANAGED BY AN ENTITY THAT CONDUCTS AS A BUSINESS) ONE OR MORE OF THE FOLLOWING ACTIVITIES OR OPERATIONS FOR OR ON BEHALF OF A CUSTOMER (1) TRADING IN MONEY MARKET INSTRUMENTS (CHEQUES BILLS CERTIFICATES OF DEPOSIT DERIVATIVES ETC.) FOREIGN EXCHANGE EXCHANGE INTEREST RATE 3 AND INDEX INSTRUMENTS TRANSFERABLE [SECURITIES BANKING/FINANCIAL TERM] OR COMMODITY FUTURES

*FIG. 10*

ML_PREDICTION OUTPUT (HTML) — 1102

| # | FEATURES | TARGET | CONFIDENCE |
|---|---|---|---|
| 1. | CONTENT: FOR PURPOSES OF THIS AGREEMENT AND ANY ANNEXES THERETO (AGREEMENT), THE FOLLOWING TERMS SHALL HAVE THE MEANINGS SET FORTH BELOW: A) THE TERM UNITED STATES MEANS THE UNITED STATES OF AMERICA, INCLUDING THE STATES THEREOF, BUT DOES NOT INCLUDE THE U.S. TERRITORIES. | RULES | 0.8168337215625376 |
| 2. | CONTENT: ANY REFERENCE TO A STATE OF THE UNITED STATES INCLUDES THE DISTRICT OF COLUMBIA. | DEFINITIONS | 0.4814212620737557 |
| 3. | CONTENT: B) THE TERM U.S. TERRITORY MEANS AMERICAN SAMOA, THE COMMONWEALTH OF NORTHERN MARIANA ISLANDS, GUAM, THE COMMONWEALTH OF PUERTO RICO, OR THE U.S. VIRGIN ISLANDS. | RULES | 0.7832629937223 |
| 4. | CONTENT: C) THE TERM IRS MEANS THE U.S. INTERNAL REVENUE SERVICE. D) THE TERM GIBRALTAR MEANS THE TERRITORY OF GIBRALTAR. E) THE TERM PARTNER JURISDICTION MEANS A JURISDICTION THAT HAS IN EFFECT AN AGREEMENT WITH THE UNITED STATES TO FACILITATE THE IMPLEMENTATION OF FATCA. | DEFINITIONS | 0.9951873521729984 |
| 5. | CONTENT: THE IRS SHALL PUBLISH A LIST IDENTIFYING ALL PARTNER JURISDICTIONS. | RULES | 0.5145877226949127 |
| 6. | CONTENT: THE TERM COMPETENT AUTHORITY MEANS: (1) IN THE CASE OF THE UNITED STATES, THE SECRETARY OF THE TREASURY OR HIS DELEGATE; AND (2) IN THE CASE OF GIBRALTAR, THE CHIEF SECRETARY OR SUCH OTHER OFFICIAL AS THE MINISTER OF FINANCE MAY APPOINT. G) THE TERM FINANCIAL INSTITUTION MEANS A CUSTODIAL INSTITUTION, A DESPOSITORY INSTITUTION, AN INVESTMENT ENTITY, OR A SPECIFIED INSURANCE COMPANY. H) THE TERM CUSTODIAL | DEFINITIONS | 0.8592479655500241 |

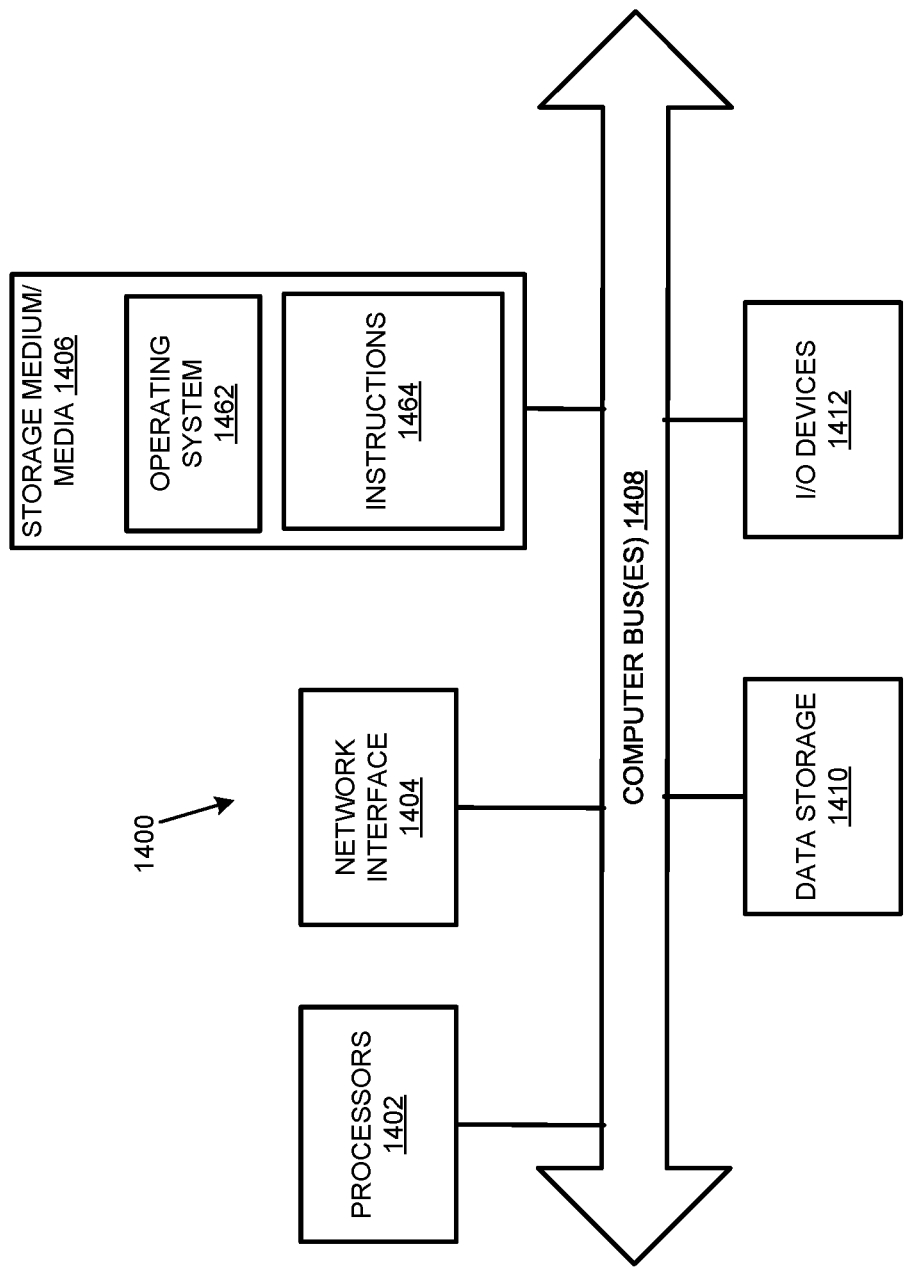

ARTIFICIAL INTELLIGENCE (AI)-BASED REGULATORY DATA PROCESSING SYSTEM

PRIORITY

The present application claims priority under 35 U.S.C. 119(a)-(d) to the Indian Provisional Patent Application Serial No. 201811037572, having a filing date of Oct. 4, 2018, the disclosure of which is hereby incorporated by reference in its entirety.

BACKGROUND

Computer systems have long been employed in document processing wherein documents were classified manually and stored for easy retrieval. However, the development of artificial intelligence (AI) and related fields including natural language processing (NLP) not only enabled the computer systems to store the documents but also enabled the computer systems to provide users separate access to the information in the stored documents. For example, the retrieval of a stored document as a non-editable image, e.g., a scanned image, requires the user to review each document in detail to identify the information therein. Computer systems are being developed to store the information from such documents in machine-readable, searchable, user-editable formats. However, the information from the documents needs to be manually processed via populating data structures with the document information in order to enable the conversion to machine-readable formats. As a result complex documents, such as regulatory specifications with a high volume of complicated textual content, need to be read and interpreted by a human user.

BRIEF DESCRIPTION OF DRAWINGS

Features of the present disclosure are illustrated by way of examples shown in the following figures. In the following figures, like numerals indicate like elements, in which:

FIG. 10 shows an entity extraction GUI which displays output of an entity extractor in accordance with the examples disclosed herein.

FIG. 11 shows a GUI which displays various portions of the received domain-specific document that are extracted and classified by a section identifier in accordance with the examples disclosed herein.

FIG. 12 shows a text annotator GUI which displays annotations created by a subject matter expert (SME) for training the data processing system in accordance with the examples disclosed herein.

FIG. 14 illustrates a computer system that may be used to implement the data processing system in accordance with the examples disclosed herein.

DETAILED DESCRIPTION

Figure 1:
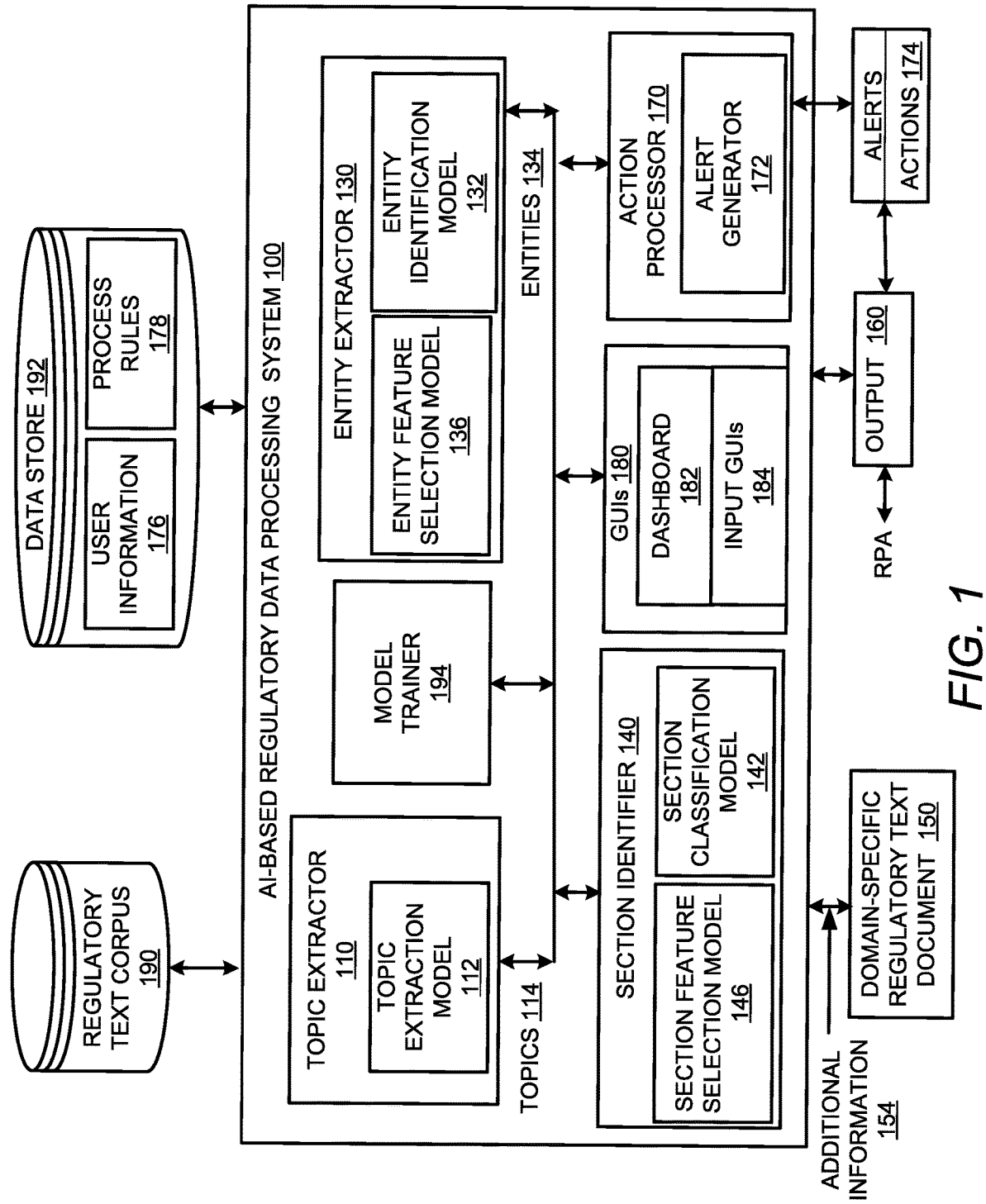
FIG. 1 shows a block diagram of an AI-based regulatory data processing system in accordance with the examples disclosed herein.

For simplicity and illustrative purposes, the present disclosure is described by referring mainly to examples thereof. In the following description, numerous specific details are set forth to provide a thorough understanding of the present disclosure. It will be readily apparent however that the present disclosure may be practiced without limitation to these specific details. In other instances, some methods and structures have not been described in detail so as not to unnecessarily obscure the present disclosure. Throughout the present disclosure, the terms "a" and "an" are intended to denote at least one of a particular element. As used herein, the term "includes" means includes but not limited to, the term "including" means including but not limited to. The term "based on" means based at least in part on.

According to one or more examples described herein, a regulatory data processing system is disclosed for automatically processing information in a complex regulatory document into a form that is usable by a processor-based device for automatic downstream processes. The regulatory data processing system includes a plurality of ML models for analyzing the information within the regulatory text and to obtain meaningful information, such as determining the actions that are to be executed in order to comply with the regulations. Various governing bodies in different domains frame rules to regulate processes being administered by those bodies in the corresponding domains. Regulations in different domains, such as the financial domain, healthcare domain, environmental domain, etc., have different terminologies and requirements. Accordingly a domain-specific regulatory text corpus is selected to provide training data for training the ML models in order to extract information from the regulatory text accurately. The regulatory text corpus includes prior regulatory documents pertaining to the specific domain. Whenever new regulations are published by a governing body corresponding to a specific domain, the data processing system can be configured to receive the domain-specific regulatory text document either via a user upload or automatically via monitoring various communication channels.

The plurality of ML models that are used to process the received regulatory text document include a topic extraction model, feature selection models, an entity identification model and a section classification model. Each of the plurality of ML models is trained on data from the domain-specific regulatory text corpus to automatically carry out the corresponding function via analyzing the received domain-specific document. The topic extraction model automatically extracts topics from the received domain-specific document with regulatory text and identifies documents from the regulatory text corpus that are relevant to the received domain-specific document. In an example, the topics can include certain keywords. The relevant documents can be compared with the domain-specific document to track the similarities and differences between prior regulations and the newer regulations. The entity identification model is used to analyze the domain-specific document and outputs entities/keywords (nouns) from the received domain-specific document. In addition, the entities thus extracted can be classified into one or more of a plurality of categories. In an example, the categories can depend on the domain to which the regulatory text in document pertains. For example, if the received domain-specific document pertains to a financial regulation, then the categories can include a government entity, a financial entity, a banking term, etc. A section identification model is trained to classify various portions of the domain-specific document into different sections which describe different aspects of newer regulations, such as the requirements put forth in the newer regulations, the rules of the newer regulations, the definitions provided by the newer regulations, etc.

Each of the plurality of ML models, e.g. the topic extraction model, the entity identification model and the section classification model, are implemented by different ML techniques and are trained on different subsets of data from the regulatory text corpus using different learning techniques. The topic extraction model is based on Latent Semantic Indexing (LSI) and is trained via unsupervised learning on the prior domain-specific documents in the regulatory text corpus. Identification of the entities in the domain-specific document includes initially obtaining linguistic features from the textual content of the domain-specific document. The linguistic features are obtained using an entity feature selection model. The entity feature selection model is based on a sequence labelling technique and learns to select features via supervised learning on annotated training data. The linguistic features thus obtained are employed by the entity identification model to identify the entities in the domain-specific document as belonging to entities of the entities identification model. The entity identification model itself is based on conditional random fields (CRF) methodology and can be trained on entity training data which includes the prior domain-specific documents with the various entities annotated and classified. The section identification also uses linguistic feature extraction from the regulatory text of the received domain-specific document. However, a section feature selection model which is employed for section identification is based on a classification technique and is also trained on labelled training data with the linguistic features annotated on a subset of the prior domain-specific documents. The section classification model which classifies portions of the domain-specific document as belonging to one of a plurality of predetermined domain-specific sections is based on Multinomial Naïve Bayes (MNB) classification type algorithm. The MNB classification type algorithm is trained via supervised learning on section training data which includes a subset of the domain-specific documents in the regulatory text corpus with annotated sections.

The output from the plurality of ML models including the topics, the entities and the sections identified from the received domain-specific document are employed in various downstream processes. In one example, the topics, the entities and the sections can be used for comparison purposes to identify similarities and differences between the received domain-specific document with new/updated regulations and prior regulations as encoded in the relevant documents retrieved from the regulatory text corpus by the topic extraction model. Various textual similarity measures, such as cosine similarity, etc., can be employed to estimate similarities or differences between corresponding sections of the current regulations and the prior versions. In another example, the actions that are to be executed in order to implement regulations outlined in the received domain-specific document can be automatically identified. Moreover, when provided with access to user information, such as user roles within an organization and user contact information, the data processing system is enabled to identify the users who are responsible for implementing the actions and update them regarding the new regulations via different communication channels.

In an example, the output from the document processor can be used to generate reports to meet the reporting requirements associated with the new regulations. The data processing system thus converts information from complex regulatory documents into output that enables automatic execution of processes. The regulatory/reporting requirements in extensible markup language (XML) or in existing text format or other machine readable formats can be read and the reporting rules in noun and verb concepts can be mapped to a process data schema through natural language processing (NLP) and sematic modelling techniques. Once the data lineage is identified for the requirements, the reports can be generated automatically for sharing by pulling information directly from the databases without any software development efforts or manual intervention to the extent of the complexity of the requirements.

Various communication channels can be employed by the data processing system to provide the actions, reports, etc. One of the communication channels can include a dashboard customized to each unique user of the data processing system. The dashboard presents the output from the data processing system including the topics, the entities and the sections obtained from the received domain-specific document. The dashboard also includes an action board which is updated with notifications including the actions that are assigned to that user. As a result, the dashboard can be communicatively coupled to various process tools such as an email server, a project management tool, a report generator and the like in order to receive the notifications. Furthermore, the output from the data processing system such as the topics, the entities and the sections obtained from various regulatory documents can be provided as input to downstream robotic process automation (RPA) tools.

Generally regulatory specifications are complex with high volumes of text. The rules and regulations are issued to be in consonance with the legal structures of the jurisdictions in which the governing bodies operate. New rules and regulations may be issued or existing rules may be updated periodically. Such rules and regulations that are published by the governing bodies tend to be voluminous with many pages of complicated verbose text requiring readers to have a high level of language and comprehension skills to understand the content therein. Moreover, a user who is tasked with understanding such rules and regulations may also need to keep track of prior versions of such rules in order to identify the changes or updates and determine the processes or actions required to secure compliance with the rules and regulations. As a result, interpreting the regulatory documents tends to be subjective and regulatory compliance tends to be expensive.

Regulatory text has complicated structure as compared to many other document types. For example, regulatory text often comprises long sentences, clauses, sub-clauses and numerous sections with corresponding headings. Converting text of this complexity into machine-consumable format using existing technologies is difficult, error prone, and produces undesirable outcomes. Not every ML model provides sufficiently accurate results for processing such complicated textual content. Moreover, different ML models may work for different textual content processing tasks. For example, while one ML model may provide adequate result for breaking up a paragraph into sentences, that ML model may not accurately be used for identifying parts of speech of the words in a sentence. Moreover, each ML model can have numerous parameters which can take one of many values. Hence, identifying the correct ML models and parameters values to be applied for analyzing complex textual content can be an arduous task.

The regulatory data processing system disclosed herein solves shortcomings associated with existing manual and automated techniques by enabling interpretation of regulatory documents through specific ML models and provides for automatic extraction of topics, entities, actions and other digital artifacts from regulatory requirements, thereby converting regulatory textual content into organized digital data. The digitized regulatory textual content enables identification of relationships and overlaps between regulations. Moreover, the digital artifacts enable consumption of regulatory information by computing platforms in order to automate the corresponding workflows or processes. The regulatory data processing system disclosed herein further enables building a regulatory compliance toolkit wherein regulatory knowledge can be offered as a service on a computing platform.

FIG. 1 shows a block diagram of an AI-based regulatory data processing system 100 in accordance with the examples disclosed herein. The data processing system 100 extracts data from regulatory textual documents and automatically converts the textual data into an output 160 that can include one or more of topics, entities, process rules, requirements and definitions that can be consumed by the downstream processes for further implementations such as RPA. In an example, the data processing system 100 can be configured for processing textual input associated with a specific domain such as but not limited to, healthcare regulations, finance regulations or banking regulations, etc. This is because the type of topics, entities and terminology used in regulations can be unique to the specific domain. Therefore, different regulatory data processing systems can be trained for analyzing and processing regulations for each distinct domain. The data processing system 100 can be coupled to a data store 192 for storing information required for executing the various processes associated with analyzing the regulatory information.

The data processing system 100 which processes domain-specific regulatory documents includes a topic extractor 110, an entity extractor 130 and a section identifier 140 in accordance with the examples disclosed herein. The data processing system 100 can be configured to receive a domain-specific regulatory text document 150 including regulatory text regarding new regulations or changes to existing regulations issued by a government or other administrative body in a particular jurisdiction. In an example, additional information 154 regarding the domain-specific document 150 can be supplied when providing the domain-specific document 150. The additional information 154 supplied can include but is not limited to, name(s) of the relevant regulation(s) (new or existing), the jurisdiction, etc. The various components of the data processing system 100 process the domain-specific document 150 to generate the output 160. The output of the data processing system 100 can include data of various formats such as textual format, extensible Markup Language (XML) format, database or other formats of data that can be further consumed by electronic processing machines implementing the downstream processes. For example, the output 160 can be used within an AI-based solution for the analysis of the regulatory texts which are presented with the context within a regulatory dashboard 182. The data processing system 100 therefore enables building a solution involving straight through processing (STP) of regulatory reporting requirements starting from building rules, impact analysis up to generation of reports through a data lineage model. In addition, the data processing system 100 can identify actions 174 to be executed in order to implement the processes outlined in the new regulation in the domain-specific document 150. The actions 174 thus identified can be directed to appropriate users for execution.

Each of the topic extractor 110, the entity extractor 130 and the section identifier 140 include one or more of the plurality of ML models hosted by the data processing system 100 for execution of the corresponding functions. A model trainer 194 can supply the appropriate training data as detailed herein to train the plurality of ML models on a regulatory text corpus 190 which is designed for improving the models' prediction confidence level. In an example, the regulatory text corpus 190 can pertain to a specific domain wherein a domain-specific data dictionary can also be built within the data processing system 100. The domain-specific data dictionary can include collections of terms, topics, entities, document sections and other words or phrases which can be expected to occur with regulations of that specific domain. The domain-specific data dictionary can include the laws, jurisdictions, governmental bodies, organizations, businesses, products, titles/roles of people implementing regulations within the specific domain etc. The domain-specific data dictionary can be built via unsupervised or supervised training provided to the data processing system 100 in accordance with the examples disclosed herein.

The topic extractor 110 includes a topic extraction model 112 for topic extraction modelling prediction. The topic extractor 110 can predict with a certain confidence level, the relationships for a given input regulatory document e.g., the domain-specific document 150 with existing regulations. Techniques, such as unsupervised learning can be used for training the topic extraction model 112 to produce a trained topic extraction model. The corpus of regulatory text 190 which is used for training the various models can include documents with similar information or pertaining to the same domain as the domain-specific document 150 such as collections of prior and existing regulations pertaining to the specific domain in different jurisdictions, e.g., different countries or different trading blocks, articles interpreting the regulations, laws pertaining to the regulations in different jurisdictions, etc. The output from the topic extractor 110 in response to feeding the domain-specific document 150 includes domain-specific topics 114 identified from the domain-specific document 150, other related documents in the regulatory text corpus 190, summarized and contextualized regulation and the overlaps and/or differences between the regulations.

The linguistic features from the domain-specific document 150 can be used by the entity extractor 130 and the section identifier 140 for the extraction of entities and document sections. The entity extractor 130 includes an entity feature selection model 136 which is trained for extracting the domain-specific linguistic features. More particularly, the entity feature selection model 136 is trained in extracting words, sentences, bodies of text, part-of-speech tagging (POS) tagging using the regulatory text corpus 190. Training the entity feature selection model 136 on the regulatory text corpus 190 of a specific domain enables the entity feature selection model 136 to interpret the terms/ words encountered in the domain-specific document 150 as normally interpreted within the specific domain. Therefore, domain-specific jargon can be interpreted accurately.

The entity extractor 130 also includes an entity identification model 132 for extracting or identifying entities from the domain-specific document 150. Entities can generally include nouns such as people, places, things, organizations, etc. The entity extractor 130 additionally processes the linguistic features in order to identify domain-specific entities 134 within the domain-specific document 150. For specific domains, entities can include phrases formed from combinations of numeric/textual data, such as, 'Rule 1.11' or similar combinations of string and numeric characters. Again, training the entity identification model 132 on domain-specific training data as provided by the regulatory text corpus 190 produces a trained entity identification model and enables the entity extractor 130 to produce more accurate output. In an example, the entity identification model 132 can be trained in named entity recognition (NER) for producing the output 160 that includes the entities/ keywords (nouns). In an example, supervised learning techniques as detailed herein can be implemented in training the entity identification model 132.

The section identifier 140 also includes a section feature selection model 146 and a section classification model 142. The section feature selection model 146 extracts linguistic features from textual content for which the section classification model 142 is employed for classifying various portions of the domain-specific document 150 into a plurality of predetermined sections. In an example, the section classification model 142 is trained on labelled training data within the regulatory text corpus 190 to produce a trained classification model for identifying predetermined sections such as but not limited to, requirements, rule and definitions from an input document such as the domain-specific document 150. The topics, entities and sections thus extracted can be employed for various purposes such as for interpreting regulatory texts by applying NLP and ML techniques. The data processing system 100 also includes a regulatory dashboard 182 which is an AI-based machine learning solution that forms part of the GUIs 180 associated with the data processing system 100 which analyzes the regulatory texts and presents it with the context. Other processes enabled by the data processing system 100 include objective interpretation involving identification of requirements, rules definitions and key entities with classification, building expertise in complex regulation through supervised learning and continuously evolving through machine learning. The data processing system 100 is also enabled for tracking regulatory amendments. Therefore, the overlaps and differences between regulations are identified. Accordingly, reports can be automatically generated from machine readable regulations via implementing the STP for regulatory reporting requirements.

The regulatory dashboard 182 is one of the various GUIs 180 associated with the data processing system 100. The regulatory dashboard 182 is customized to each unique user of the data processing system 100 so that the information obtained from the domain-specific document 150 can be presented in context along with other information gathered by the data processing system 100. For example, the domain-specific document 150 can be presented along with other relevant regulations, such as, changes in the domain-specific document 150 when compared to other relevant regulations, the topics 114, the entities 134, etc., which are extracted from the domain-specific document 150. The output 160 is also employed by an action processor 170 to identify particular actions 174 that each of the individual users of the data processing system 100 are to execute in order to implement the processes outlined by the domain-specific document 150. The actions 174 are determined based on user information 176 and process rules 178. The process rules 178 can be determined manually or automatically by analyzing the text within one or more of the regulatory text corpus 190 and the domain-specific document 150. Automatically determining the process rules 178 involves using NLP techniques to identify verbs and related 'W' queries such as 'who', 'what', 'when', etc. via NER techniques in conjunction with the user information 176 that can provide responses to the 'Who' query which identifies the users responsible for implementing the regulations. Some of the GUIs can include input GUIs which enable the data processing system 100 to receive the additional information 154, to train the ML models, etc.

The actions 174 thus determined can be conveyed to the users by an alert generator 172 that generates and transmits alerts via emails, text messages, etc., to the users. The action processor 170 can access the user information 176 related to the user roles associated with the actions 174 to be executed in addition to the contact information of the users associated with the user roles. The actions 174 can each be associated with a priority that is indicative of one or more of the time period in which each action is to be completed. An action board customized to a particular user forms a part of the regulatory dashboard 182 and serves to display the actions 174 required by the domain-specific document 150 to the particular user in near real-time.

Figure 2:
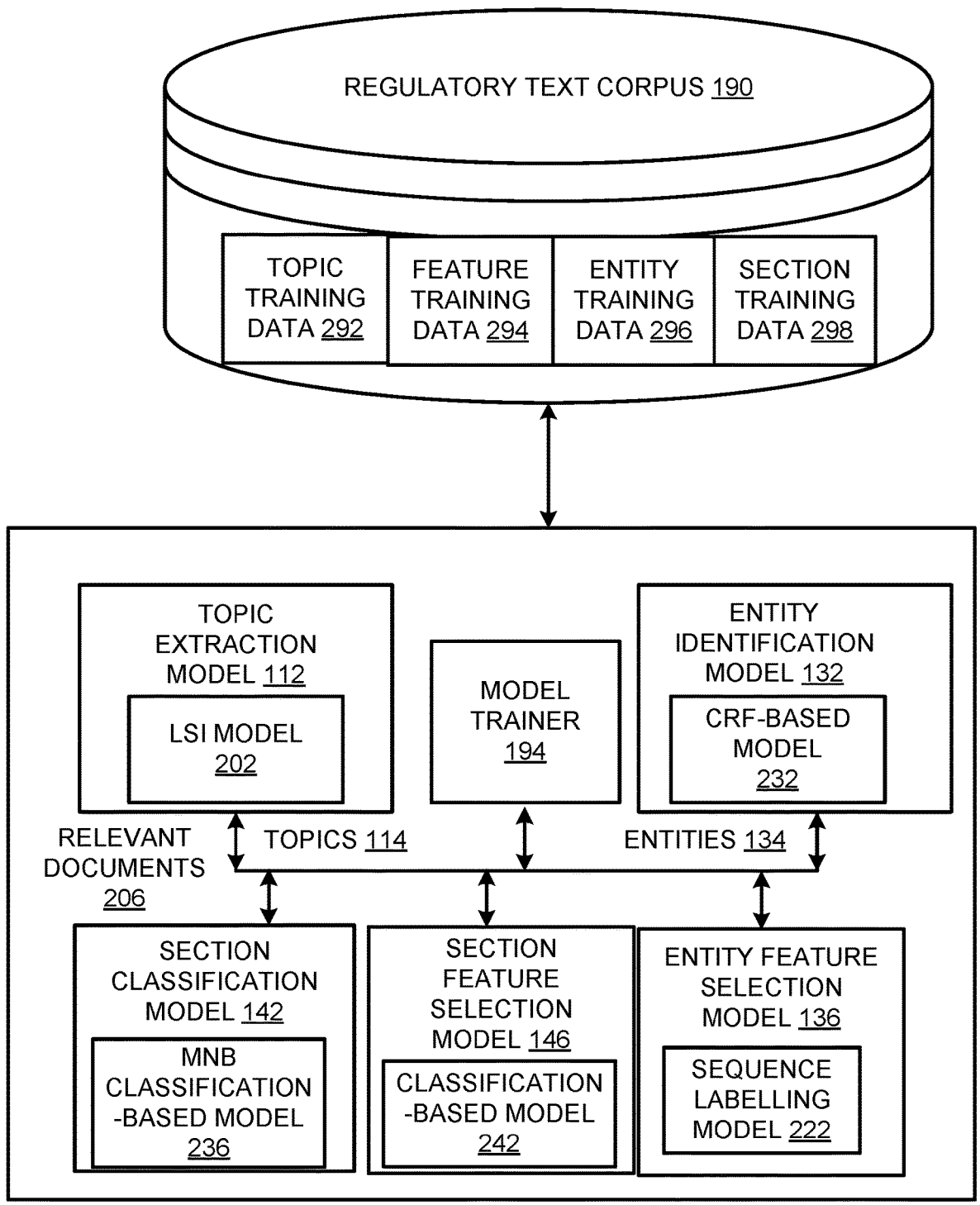
FIG. 2 shows a block diagram of the various machine learning (ML) models employed in the data processing system in accordance with the examples disclosed herein.

FIG. 2 shows a detailed block diagram of the components of the data processing system 100 that train the various ML models in accordance with the examples disclosed herein. The topic extraction model 112 is trained by the model trainer 194 via unsupervised learning. The topic extraction model 112 is based on LSI which provides a Generative and Matrix Decomposition method to extract topics from documents. The LSI model 202 is trained on the topic training data 292 in the regulatory text corpus 190. The topic training data 292 can include various domain-specific regulatory documents including the various domain-specific topics. As mentioned above, the data processing system 100 is being trained for analyzing document associated with a specific domain and accordingly, the various models employed are also trained on that particular domain-specific training data to improve accuracy of the predictions. The output from the LSI model 202 can include not only the topics 114 in the domain-specific document 150 but also the relevant documents 206 from the regulatory text corpus 190.

The entity feature selection model 136 is trained on the feature training data 294 to extract various linguistic features of a body of text at token, sentence and document levels for identification of entities by the entity extractor 130. The feature training data 294 includes training data wherein the different linguistic features in a large volume of regulatory documents are annotated or labelled. Various features are extracted using syntactic component POS tags, corpus feature components like bag-of-words, Term Frequency-Inverse Document Frequency (TF-IDF) and language modelling component (n-gram), etc. While different statistical methods can be used for feature selection, the entity feature selection model 136 is based on Sequence Labelling methodology. The sequence labelling model 222 is trained on labelled feature training data 294 wherein the various features to be identified are labelled or annotated.

The entity identification model 132 is trained by the model trainer 194 which provides annotated entity training data 296 from the regulatory text corpus 190. The entity identification model 132 is created using Conditional Random Fields (CRF) technique. The annotated entity training data 296 stores the various prior regulatory documents that are marked up or tagged with the domain-specific entities. The data processing system 100 includes the entity identification model 132 that identifies one or more domain-specific entities from the domain-specific document 150 based on the training from the annotated entity training data 296. By way of illustration and not limitation, the entity identification model 132 can be trained to identify various classes of entities for financial services regulatory texts when regulations for financial sector are being analyzed. For example, various data dictionaries pertaining to financial instruments, banking terms, banking accounts, financial institutions, faxes, laws/acts, governments, regulatory terms, etc., can be developed and the terms therein can be identified within the annotated entity training data 296. By using the CRF-based model 234 and the features from the entity feature selection model 136, the entity extractor 130 generates output including the various domain-specific entities i.e., the entities 134 that are automatically identified from the domain-specific document 150.

The section feature selection model 146 is trained to extract various linguistic features of a text at token, sentence and document level to aid classification of various portions of domain-specific documents under different sections by the section identifier 140. Various features are extracted using syntactic component POS tags, corpus feature components like bag-of-words, TF-IDF and language modelling component (n-gram), etc. While different statistical methods can be used for feature selection, a classification-based model 242 is identified as selecting the best feature set for ML training. The selection method parameter for the classification-based model 242 can be set to "select percentile", the percentile parameter is set to "80" while the scoring mode parameter can be set of "Chi2".

The section classification model 142 is trained on section training data 298 to identify the various sections within the domain-specific document 150. Again, the section identifier 140 is trained to identify different sections for a specific domain. For example, the section training data 298 pertaining to the finance domain or banking sector can include sections labelled as requirements, business rules, definitions, non-core requirements, further reading, cross-references, background, reporting requirements, audit requirements, etc. The section labels/headings may vary for different domains. The section training data 298 can include documents within the regulator text corpus 190 wherein the aforementioned sections are manually labelled by a SME, classifying the various sections in the regulations into the above classes.

Among the various statistical methodologies that can be employed for section identification, a MNB classification-based model 236 was identified as producing the most accurate output. The output of the MNB classification-based model 236 includes the various portions of the domain-specific document 150 identified or classified into one of the above-mentioned sections.

Figure 3:
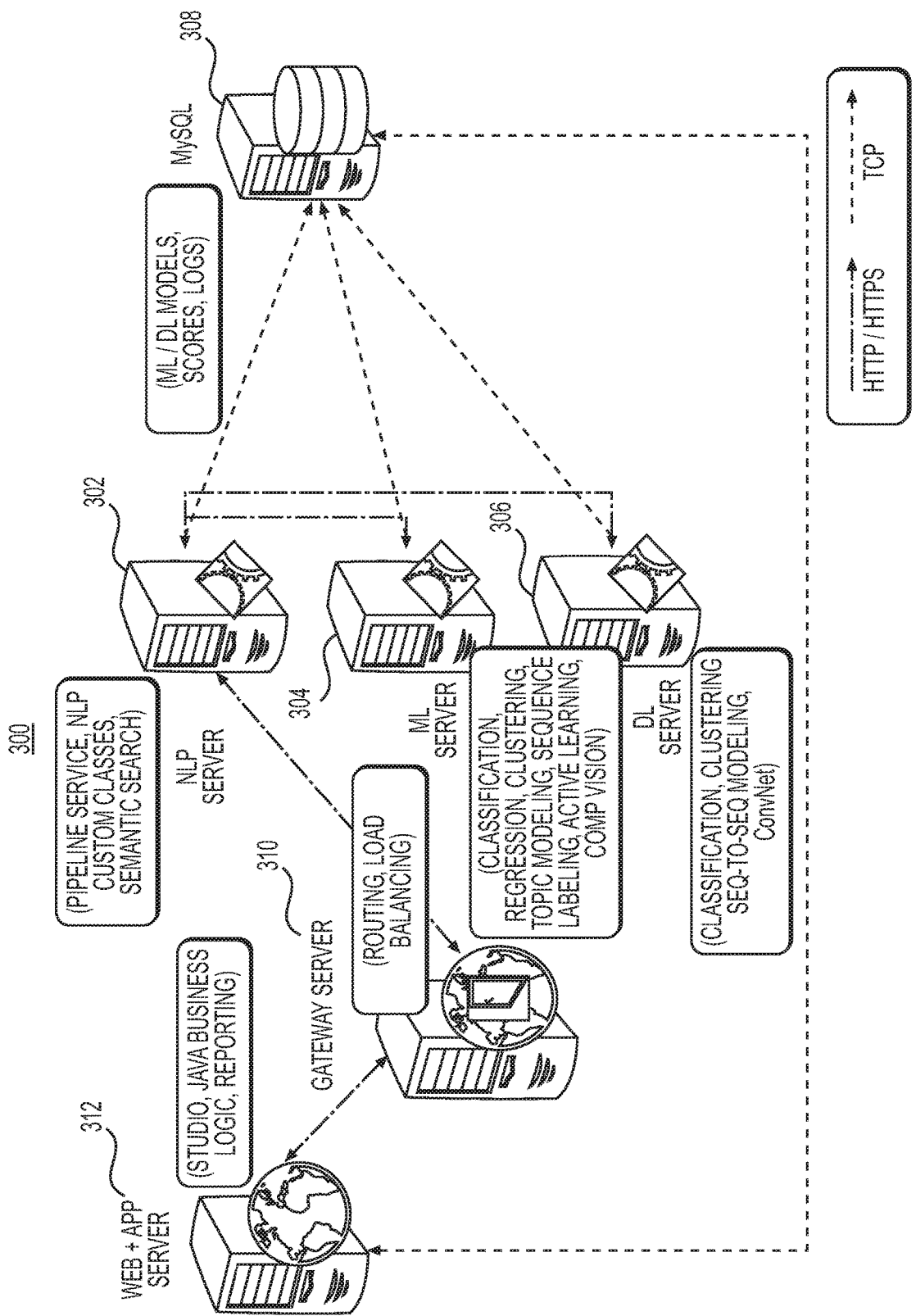
FIG. 3 shows a network of computer systems that can be employed to implement the data processing system in accordance with the examples disclosed herein.

FIG. 3 shows a networked computer system 300 that can be employed to implement the data processing system 100 in accordance with the examples disclosed herein. The various AI-based processes for the topic extractor 110, the entity extractor 130 and the section identifier 140 are executed on each of the NLP server 302, the ML server 304 and the Deep Learning (DL) server 306. Each of the servers 302, 304 and 306 can host one or more of the topic extraction model 112, the entity feature selection model 136, the section feature selection model 146, the entity identification model 132 and the section classification model 142. The MySQL server 308 can host training and test data for the various data models such as the regulatory text corpus 190. The NLP server 302 enables execution of the pipeline service for training the ML models, NLP, custom classes and semantic search which enables identifying relevant documents for a receive regulatory text document. The ML server 304 enables classification, regression, clustering, topic extraction modelling, sequence labelling, active learning and computer vision etc. The DL server 306 enables classification clustering, sequence-to-sequence modeling, deep convolutional networks etc. The gateway server 310 provides routing and load balancing services which enable communications between the various servers and the user machines for example, to transmit alerts. The web/application server 312 hosts the front end including Web Studio, Java business logic and reporting which are used for the generation of GUIs 180 that enable the data processing system 100 to receive new regulatory documents, the user input related to the new regulatory documents and to provide output via generating the regulatory dashboard 182, updating the action board, etc.

Figure 4:
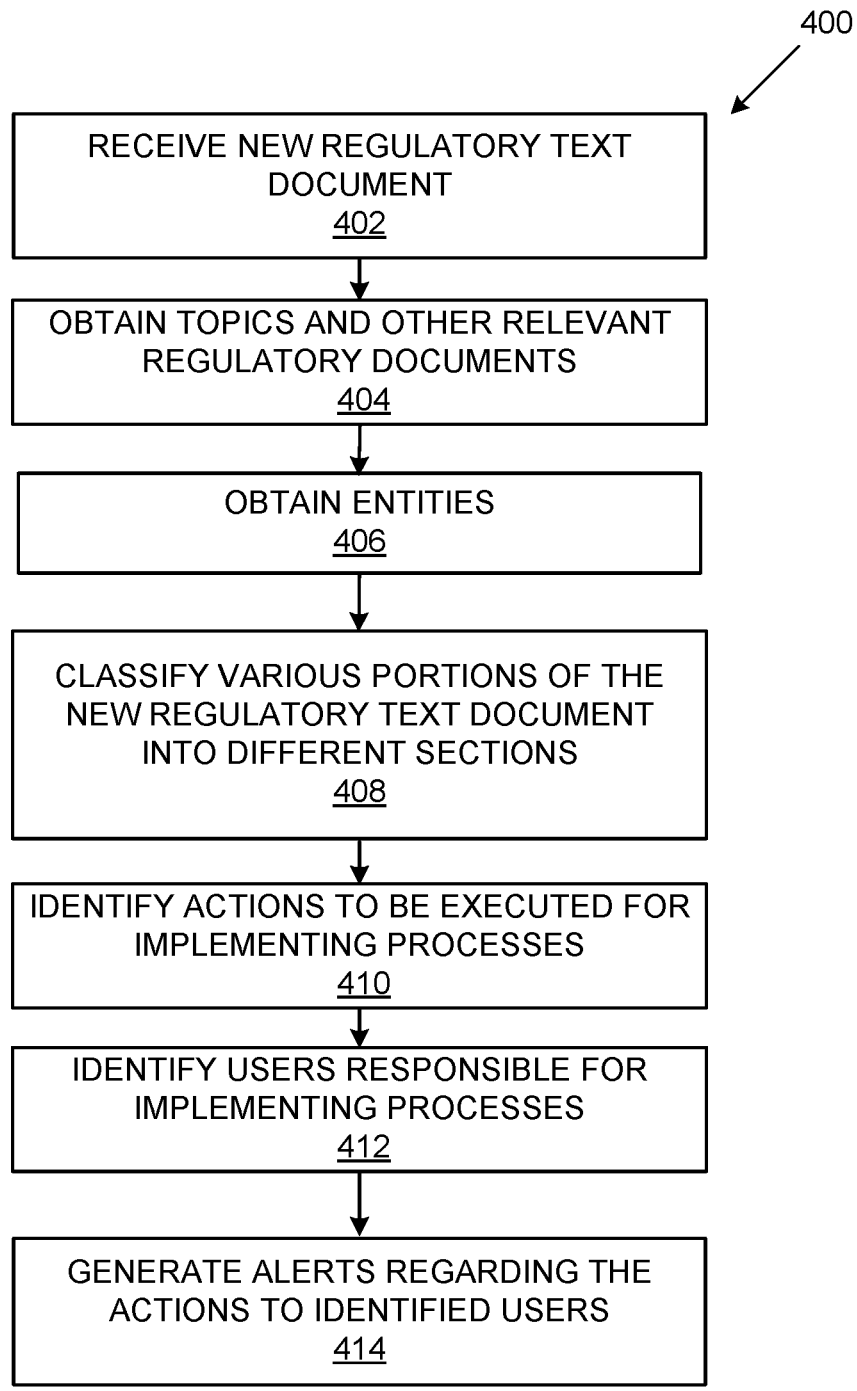
FIG. 4 shows a flowchart that details an example method for processing a received domain-specific document in accordance with the examples disclosed herein.

FIG. 4 shows a flowchart 400 that details the steps involved in processing the domain-specific document 150 in accordance with the examples disclosed herein. The method begins at 402 wherein the domain-specific document 150 is received. The domain-specific document 150 can be manually uploaded by a user to the data processing system 100 or it can be received automatically via a tool, e.g., the regulations radar which is included in the dashboard 182. The regulations radar can be configured to monitor certain channels such as certain email inboxes or social media channels etc. to access the domain-specific document 150. The topic extractor 110 analyzes the domain-specific document 150 at 404 to initially extract the topics 114 in accordance with the methods discussed herein. In addition, other relevant regulatory documents can also be identified and output by the topic extractor 110 at 404. For example, other relevant regulatory documents can be retrieved from a database or another source.

The entity extractor 130 identifies the domain-specific entities from the domain-specific document 150 at 406. Various classes of domain-specific entities which correspond to names of organizations, roles of users, names of the laws, regulations, dates, places, etc., occurring in the domain-specific document 150 can be obtained. At 408, the section identifier 140 classifies various portions of the regulatory text document under various domain-specific headings based on the training provided to the section classification model 142 by the section training data 298. The information thus obtained from the domain-specific document 150 is employed at 410 to identify the actions 174 that are to be executed for implementation of the processes outlined in the regulations of the domain-specific document 150. At 412, the users responsible for the execution of the actions 174 are identified based on the user information 176 and/or the information provided at the time of uploading the domain-specific document 150 and the alerts are sent out to the identified users at 414. In an example, the output 160 can also be used to build a RPA solution involving STP of regulatory reporting requirements starting from building rules, impact analysis up to generation of reports through a data lineage model. In addition, the data processing system 100 can identify actions 174 to be executed in order to implement the processes outlined in the new regulation in the domain-specific document 150. The actions 174 thus identified can be directed to appropriate systems and/or users for execution. Thus, information from verbose, complicated textual documents is converted into machine consumable formats.

Figure 5:
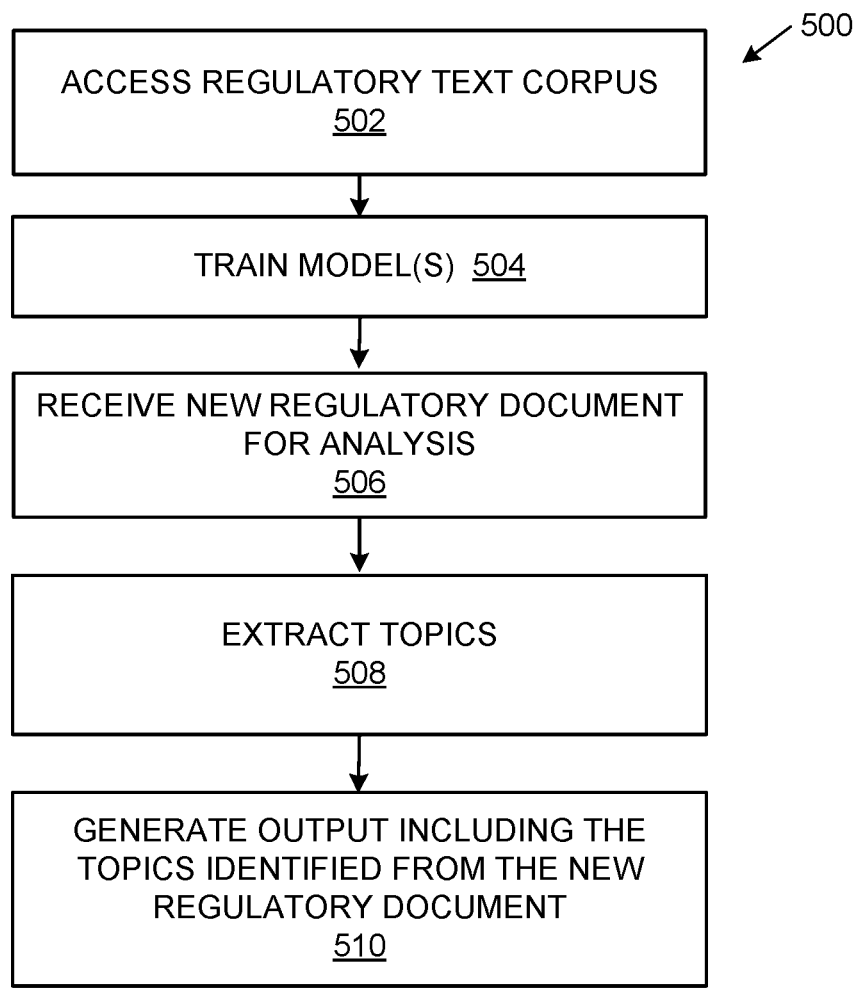
FIG. 5 shows a flowchart that details an example method for extracting topics from the received domain-specific document in accordance with the examples disclosed herein.

FIG. 5 shows a flowchart 500 that details an example method of processing the domain-specific document 150 to extract the topics 114 in accordance with the examples disclosed herein. The method begins at 502 wherein the regulatory text corpus 190 is accessed. The regulatory text corpus 190 can include the topic training data 292 such as prior regulatory documents that are not labelled and therefore used for unsupervised learning. At 504, the topic extraction model 112 employed by the data processing system 100 is trained via unsupervised learning for topic extraction. Techniques such as but not limited to Latent Dirichlet Allocation (LDA), LSI, Random Projection (RP) and Non-negative matrix factorization (NMF) can be implemented for the topic extraction model 112. However, the LSI model 202 may provide the most accurate results for the domain-based or domain-specific regulatory text analysis. More particularly, the LSI model 202 with the number of topics parameter set to 10, the chunk size to 20000, decay set to 1.0 and OnePass parameter set to 'true' can be used for the topic extraction model 112. It can be appreciated that the discussion of model parameter values is provided herein for illustration purposes only and that other model parameters may be used in accordance with the embodiments disclosed herein. A new regulatory document e.g., the domain-specific document 150 with the new regulatory text is received at 506. The topics are extracted from the domain-specific document 150 at 508 using the LSI model 202 with the parameters set as described above. The output including the topics 114 identified from the domain-specific document 150 and additional relevant documents is generated at 510.

Figure 6:
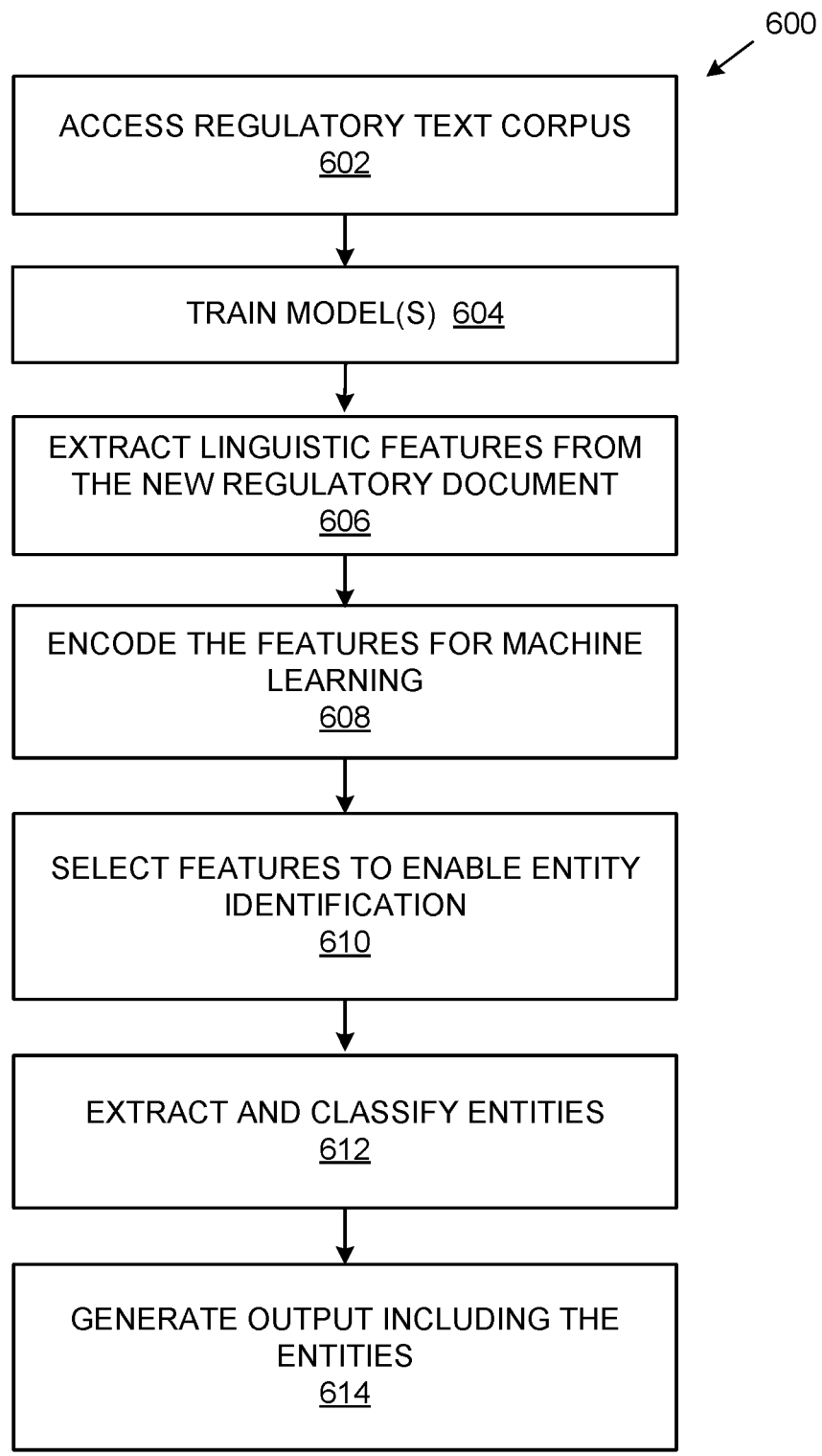
FIG. 6 shows a flowchart that details an example method of analyzing the received domain-specific document to identify entities in accordance with the examples disclosed herein.

FIG. 6 shows a flowchart 600 that details an example method of analyzing a regulatory document to identify entities in accordance with the examples disclosed herein. The method begins at 602 wherein the regulatory text corpus 190 is accessed. The regulatory text corpus 190 stores thereon, the feature training data 294 and the entity training data 296 which include documents that are analyzed and marked up by a SME with distinct linguistic features and domain-specific entities for training the ML models for feature selection and entity identification. At 604, the models, e.g., the entity feature selection model 136 and the entity identification model 132 employed by the data processing system 100, are trained via supervised learning. Sequence labelling methodology with the selection method parameter set to select percentile and the percentile parameter set to 70 percentile with Chi squared scoring mode is used for the entity feature selection model 136. The sequence labelling model 222 and the CRF-based model 232 are thus obtained at 604. The domain-specific document 150 is analyzed to extract the linguistic features from the text at 606. The extracted features are encoded for machine learning at 608 and the features relevant for entity identification are selected at 610. For example, features at token or at the sentence level including unigrams, bi-grams or other n-gram tokens can be selected at 610 from the text of the domain-specific document 150 for the entity identification. The entities in the domain-specific document 150 are identified and classified at 612. The entities can be classified into different domain-specific classes such as financial instrument, banking terms, etc. as described above for the financial domain. Similarly other classes can be defined and the ML models can be trained to identify entities for other domains such as healthcare, environmental, transportation, etc. The output including the classified entities from the domain-specific document 150 is generated at 614.

Figure 7:
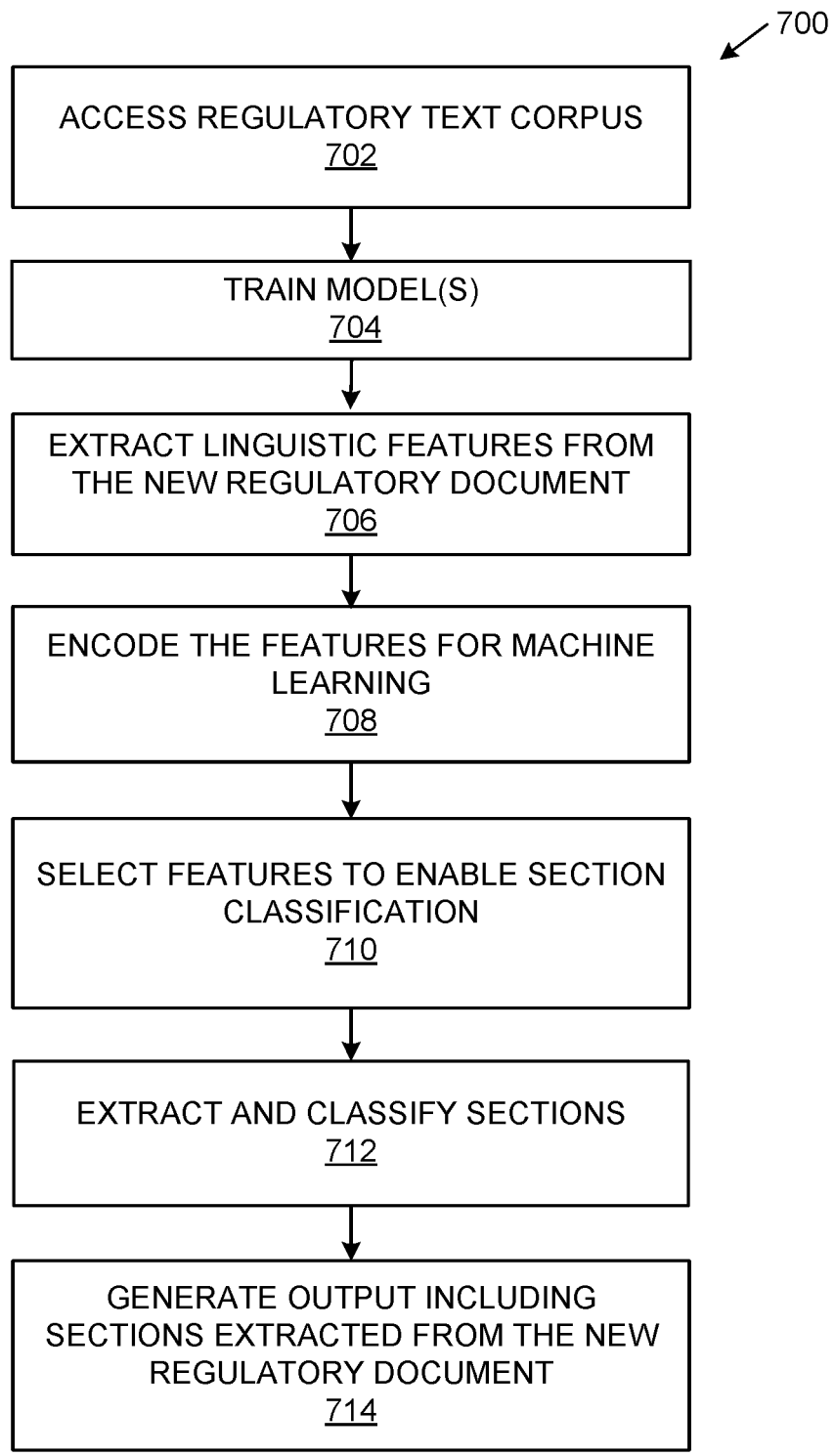
FIG. 7 shows a flowchart that details an example method of classifying portions of the received domain-specific document into one of a plurality of sections in accordance with the examples disclosed herein.

FIG. 7 shows a flowchart 700 that details an example method of analyzing a regulatory document to classify the document into sections portions of a received regulatory document in accordance with the examples disclosed herein. The method begins at 702 wherein the regulatory text corpus 190 is accessed. The regulatory text corpus 190 stores thereon, the feature training data 294 and the section training data 298 which include documents that are analyzed and marked up by a SME with distinct linguistic features and domain-specific sections for training the ML models for feature selection and section classification. It can be appreciated that generally training of the various ML models described herein also involves testing wherein a portion of the training data is used to train the ML models while another portion of the training data or other test data is used to test the ML models. During the testing of the ML model, the output from the ML model being tested can be validated by a SME. At 704, the models, e.g., the section feature selection model 146 and the section classification model 142 employed by the data processing system 100, are trained via supervised learning. Classification methodology with the selection method parameter set to "select percentile" and the percentile parameter set to 80 percentile with "Chi squared" scoring mode are used for obtaining the classification-based model 242. The MNB classification-based model 236 is created using the classification-type MNB algorithm with example parameters as shown below:

| Algorithm Parameters | |
|---|---|
| Fit prior | True |
| Alpha | 1 |
| Class prior | None |
| Cross Validation | |
| Name | KFold |
| N folds | 3 |
| Shuffle | False |
| Random state | None |

The domain-specific document 150 is analyzed to extract the linguistic features from the regulatory text therein at 706. The extracted features are encoded for machine learning at 708 and the features relevant for section classification are selected at 710. The sections in the domain-specific document 150 are extracted and classified 712 into one or more sections including requirements, rules, definitions, etc. The output including the classified sections from the domain-specific document 150 is generated at 714.

Figure 8:
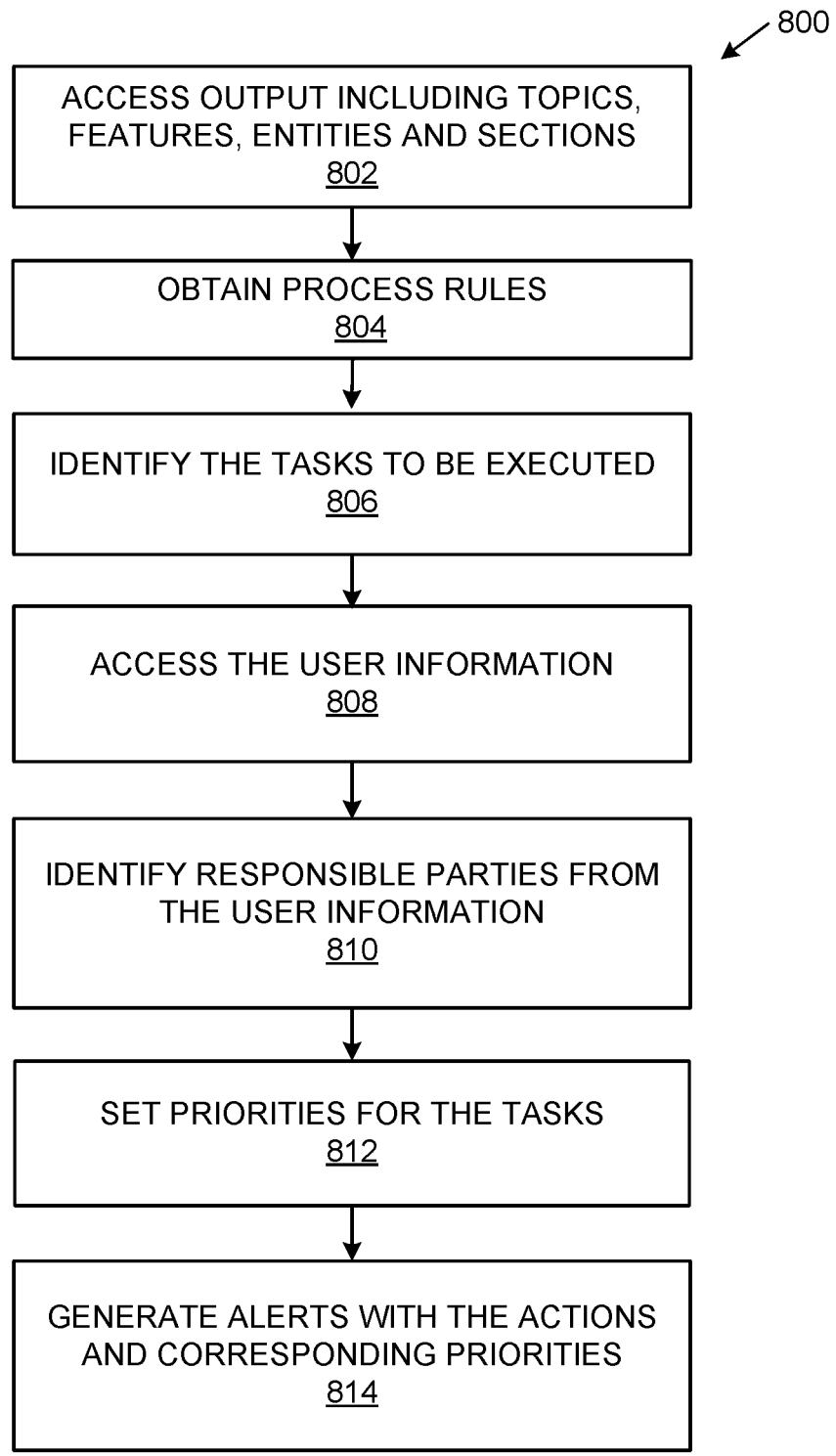
FIG. 8 shows a flowchart that details a method of automatically identifying actions and users associated with the actions in accordance with the examples disclosed herein.

FIG. 8 shows a flowchart 800 that details a method of automatically identifying actions and the users associated with the actions in accordance with the examples disclosed herein. The method begins at 802 wherein the output 160 including the topics 114, the entities 134 and the portions of the domain-specific document 150 along with their section classifications is obtained by the action processor 170. At 804, the process rules 178 that detail for example, the actions to be taken and the responsible parties including one or more of users or systems for the actions are obtained. The output 160 can be used for both automated actions and identifying actions for users to implement the processes manually depending on the requirements identified in the regulations outlined in the domain-specific document 150. If it is a simple regulatory reporting requirement involving generating a new report or update to the existing reports, the output 160 can be used to build a RPA solution though a data lineage model. The data lineage model that can track data from the data origins to where the data moves over time such as from files to databases and to reports while undergoing various transformations. Automatic actions can include complying with regulatory reporting requirements involving generating a new report or updating an existing report. However, for more complex processes such as a process change or changes to existing systems, the data processing system 100 can identify the actions 174 to be executed and the systems that are target of such actions in order to implement the changes outlined in the new regulation in the domain-specific document 150. The actions 174 thus identified can be directed to appropriate users for execution. The process rules 178 can be derived from the output 160 of the data processing system 100 which includes the topics 114, the entities 134 and the sections of the domain-specific document 150. Input such as the additional information 154 provided along with the domain-specific document 150 can also be used to obtain the process rules 178. At 806, the tasks to be executed in order to implement processes as outlined in the domain-specific document 150 are identified. The tasks can be identified at 806 using language processing techniques such as string comparisons, POS tagging, etc. For example, one or more sections corresponding to requirements sections and the topics that include one or more verbs can be identified based on the POS tagging and string comparison or context matching techniques can be employed to compare the verbs under the requirements section(s) from the domain-specific document 150 with the verbs in the process rules 178. Similarly, the user information 176 is accessed at 808 and the responsible parties such as one or more of users or the corresponding departments, teams for executing the actions are identified at 810 using string comparisons and entity processing between the process rules 178 and the user information 176 so that users with titles or users associated with departments that match those mentioned in the process rules 178 are selected as responsible parties at 810. The priorities can be set at 812 using at least the date entities in comparison with a current system time to identify urgency. For example, an urgency threshold can be set so that if the date is closer or the time period for executing the action is less than the threshold, then that action can be marked as urgent. In addition, urgency/non-urgency can also be identified via recognition of specific terms so that presence or absence of certain terms signify a priority level. The alerts are generated or corresponding action boards of the users are updated with the actions and the corresponding priorities at 814. The alerts can be transmitted to each individual email of each of the users or a customized action board of the user can be updated with information from the alerts.

Figure 9:
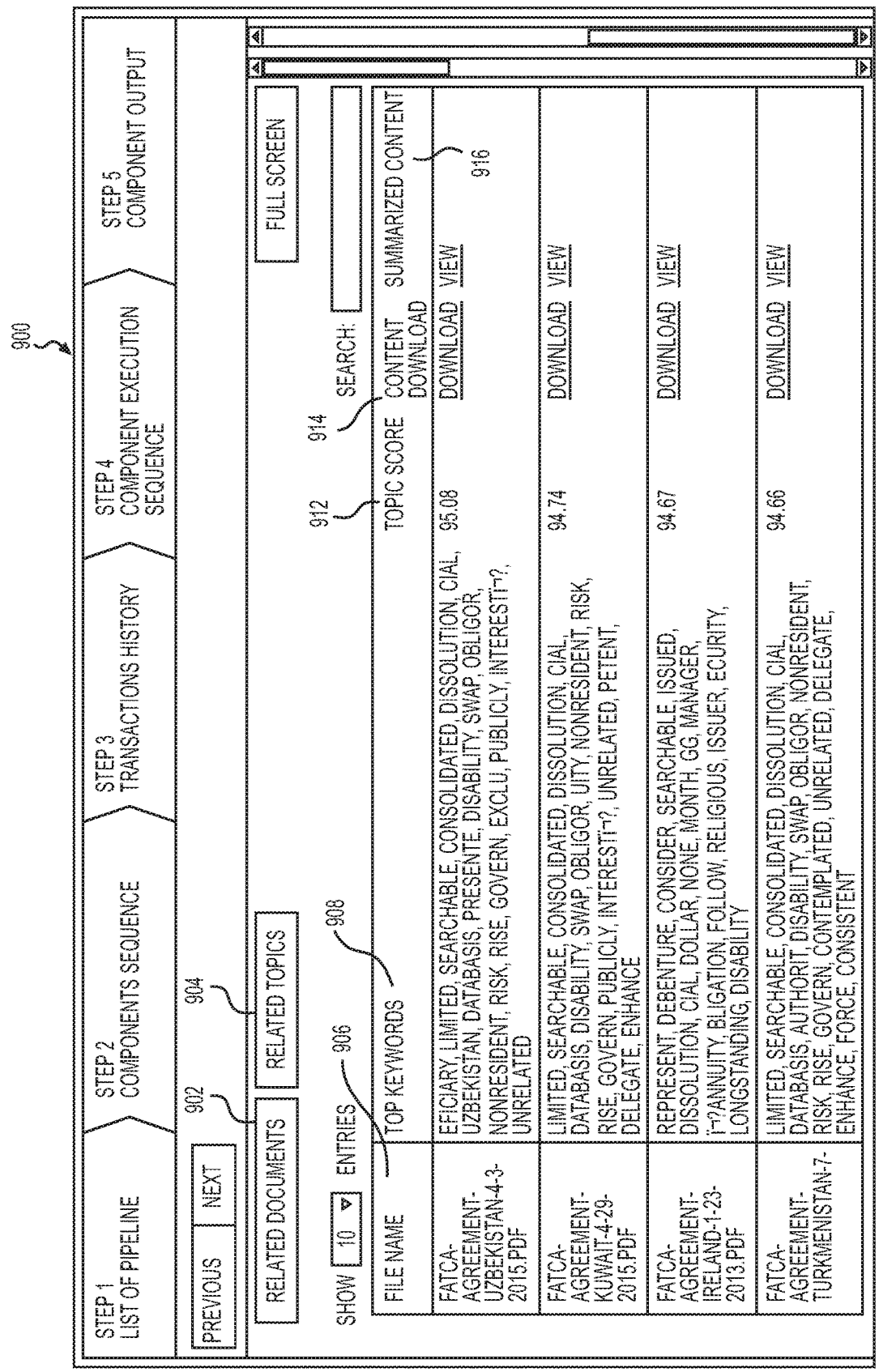
FIG. 9 shows a graphical user interface (GUI) that displays output from a document processor in accordance with the examples disclosed herein.

FIG. 9 shows a GUI 900 that displays the output 160 from the data processing system 100 in accordance with the examples disclosed herein. The output 160 includes identities of related documents 902 as determined by the topic extractor 110, the related topics 904 obtained by the entity extractor 130 for a received input document such as the domain-specific document 150. The related documents 902 are identified with a certain confidence level. Various details of the related documents such as the file name 906, the top keywords 908, the topic score 912, links for content downloading 914 and the summarized content 916 are included in the GUI 900. The related documents 902 can be arranged in a descending order of their topic scores 912. Similar regulatory documents from the regulatory text corpus 190 can be used for predicting the relationships between the regulations with confidence level for a given input regulatory document. For example, the GUI 900 shows the confidence levels between a received input document and the various Foreign Account Tax Compliance Act (FATCA) regulation documents. The data processing system 100 can be employed for analyzing a new regulatory document for a new jurisdiction and to identify relationships between the documents and similarities between the regulations and commonalities. Such similarities can be used to identify patterns in regulations issued in different jurisdictions across the globe. New clauses with respect to a base regulation can also be identified via text comparison techniques between two documents.

In an example, text similarity can be estimated between the identified relevant documents and the received domain-specific document 150 via techniques such as cosine similarity. More particularly, corresponding sections such as the requirements sections or the definitions sections of one of the prior domain-specific document identified as relevant and the received domain-specific document 150 can be analyzed for similarity. If any dissimilarities are identified or if the corresponding sections are found to have less similarity than a predetermined similarity threshold, then such sections can be pointed out to the user on one of the GUIs 180. Therefore, the data processing system 100 is enabled to identify similarities and disparities between complex textual documents such as regulations.

FIG. 10 shows an entity extraction GUI 1000 which displays the output of the entity extractor 130 in accordance with the examples disclosed herein. The entity extractor 130 employs the entity feature selection model 136 and the entity identification model 132 which are trained on similar documents as the input FATCA documents for identifying and classifying the key entities in an input file or document such as the domain-specific document 150. The entities identified and classified by the entity extractor 130 are shown. For example, 'IRS' is recognized as an entity and classified as a government body, 'FATCA' is recognized as an entity and classified as a regulatory term while 'securities' is classified as a banking/financial term, 'Depository institution', 'Specified Insurance Company', 'Investment Entity' are identified and classified as financial entities.

FIG. 11 shows a section classification GUI 1100 which displays the various portions of a domain-specific regulatory text document that were extracted and classified by the section identifier 140 in accordance with the examples disclosed herein. The various portions 1102 are classified into one of the sections or targets 1104 which include rules, definitions, requirements, etc. Each portion classification into one of the sections is associated a certain confidence 1106. Thus, for each portion, the section identifier 140 or more particularly, the MNB classification-based model 236 obtains a confidence level against the various predetermined sections and the section with the highest confidence level is selected for classifying that portion. The number of sections identified can be extended further based on inputs from a user. For example, classification of sections 3 and 4 as rules and confidence levels 1108, 1110 associated with the classifications are also displayed.

Figure 12:
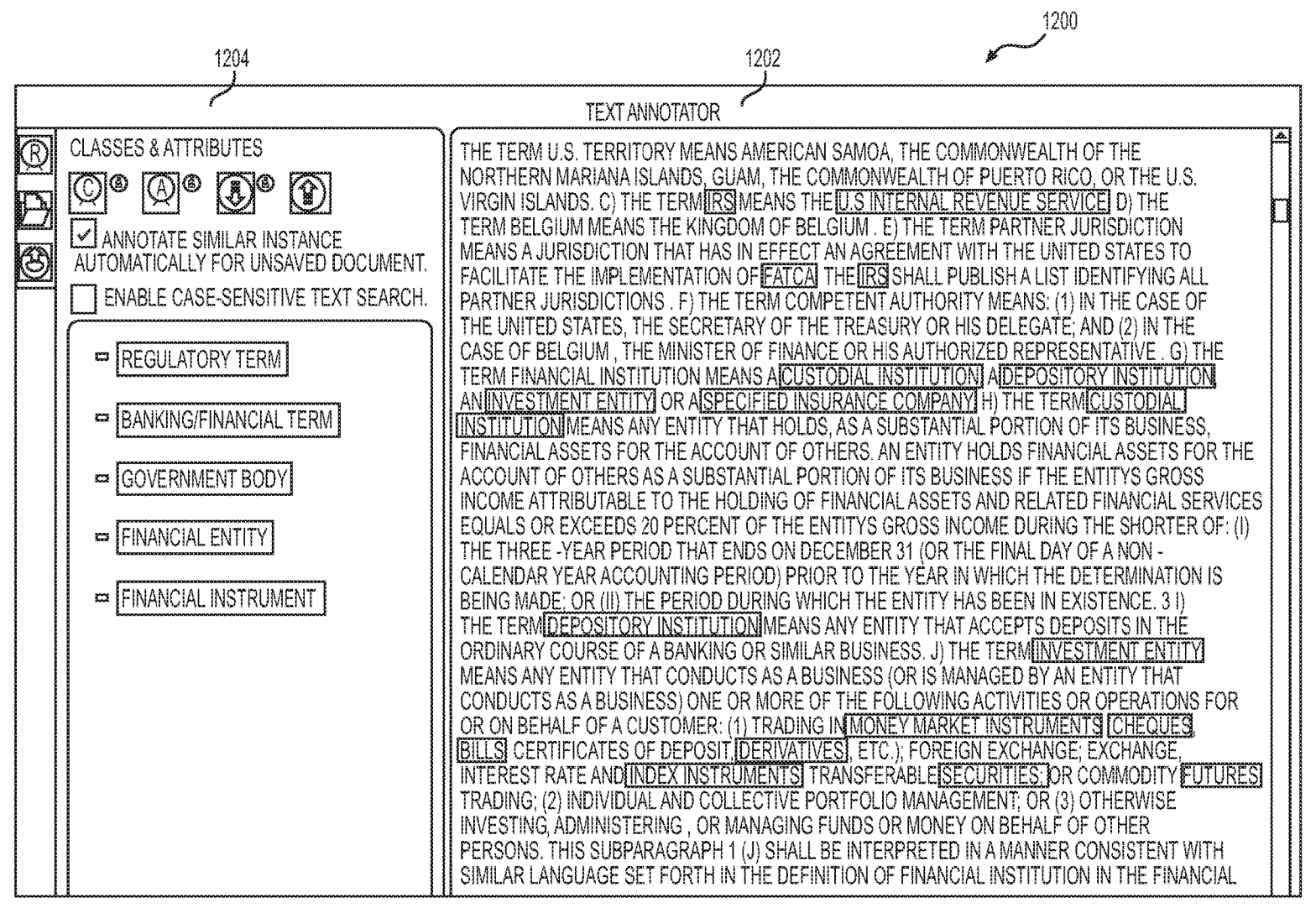

FIG. 12 shows a text annotator GUI 1200 which displays the annotations created by a SME for training the data processing system 100 in accordance with the examples disclosed herein. The text annotator GUI 1200 shows the various entities such as U.S. Internal Revenue Service, etc., which are highlighted on the right hand side (RHS) 1202 by the SME and classified as a regulatory term, banking/financial term, Government entity, etc., on the left hand side (LHS) 1204 of the text annotator GUI 1200. The input from the SME thus obtained is used to train the entity extractor 130 to produce the output shown in the text annotator GUI 1200. Similar GUIs can be used for training the feature selection models and the section identifier 140.

Figure 13:
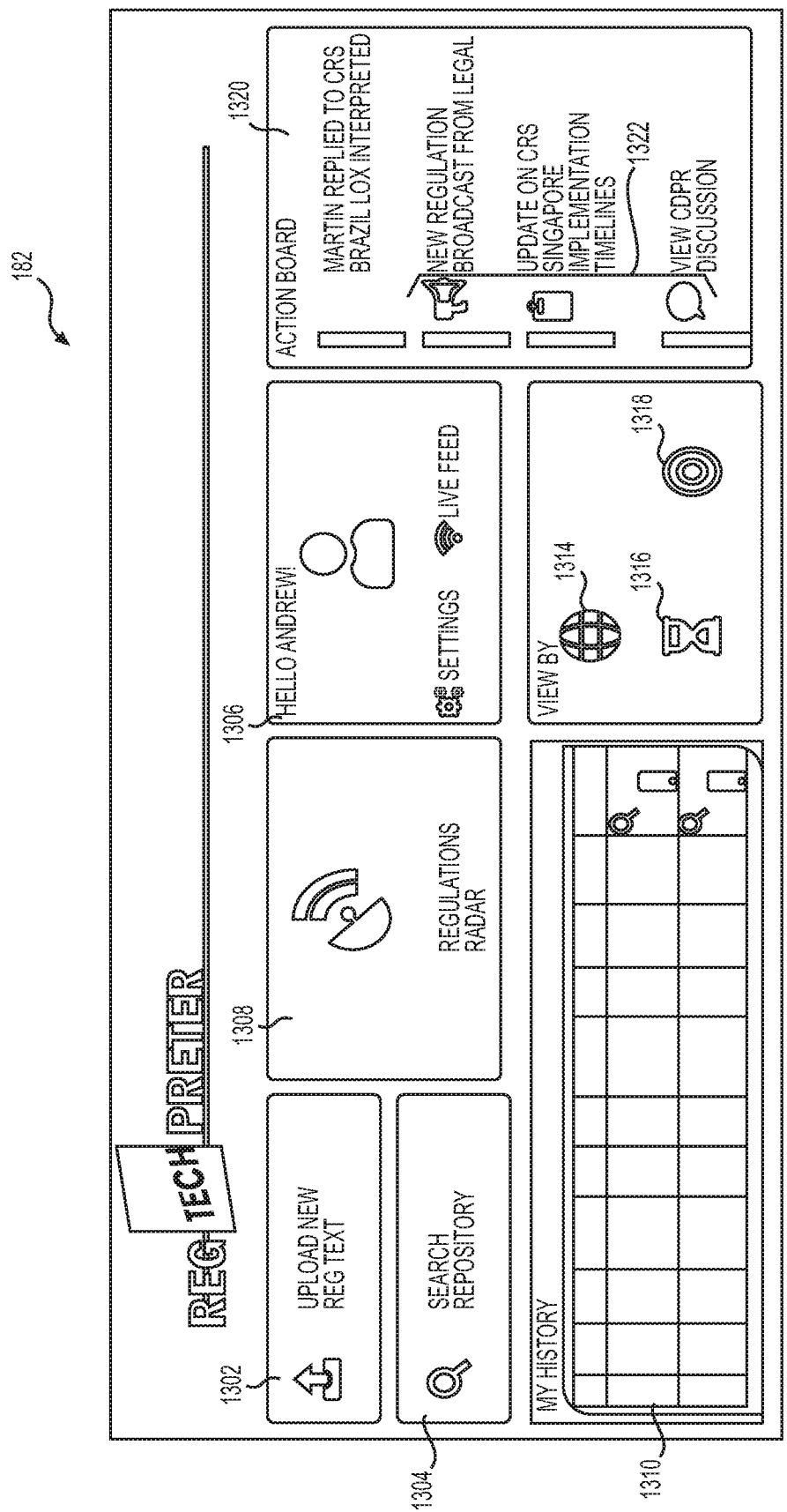
FIG. 13 shows an example dashboard for presenting regulatory information customized for a user in accordance with the examples disclosed herein.

FIG. 13 shows an example dashboard 182 for presenting regulatory information customized to a user 1306 in accordance with the examples disclosed herein. The dashboard 182 includes an upload button 1302 for providing regulatory documents such as the domain-specific document 150 to the data processing system 100. In some examples, the data processing system 100 may receive the documents from other modalities as mentioned above such as from email inboxes, social media channels, etc. An additional mechanism—a regulations radar 1308—provides a mechanism for the data processing system 100 to automatically receive new regulations documents. The regulations radar 1308 enables the user 1306 to subscribe to specific channels e.g., social media accounts, web feeds etc., to monitor for new regulations. A search button 1304 enables manual search of the regulatory text corpus 190. The user's 1306 search history 1310 is shown under the 'My History' tab 1310. Various options including, jurisdictions 1314, time 1316 and specific regulations 1318 are provided to filter the user's 1306 search history.

In addition, an action board 1320 is also included in the dashboard 182. The action board 1320 includes a plurality of content types such as the various actions and notifications that are manually or automatically derived from the various regulatory documents for the user 1306. In an example, the action board 1320 can be configured to connect to a plurality of tools such as the user's 1306 email, project management software, chat boards, etc., via the tools' corresponding application programming interfaces (APIs) and a search can be set up with specific keywords or specific subject matter in order to populate the action board 1320. The action board 1320 can be further configured to display different informational icons 1322 for content from different sources. For example, a notification from a chat board may have a different icon when compared to a notification or an update from a project management tool.

FIG. 14 illustrates a computer system 1400 that may be used to implement the data processing system 100. More particularly, computing machines such as desktops, laptops, smartphones, tablets and wearables which may be used to generate or access the data from the data processing system 100 may have the structure of the computer system 1400. The computer system 1400 may include additional components not shown and that some of the process components described may be removed and/or modified. In another example, a computer system 1400 can sit on external-cloud platforms such as, Amazon Web Services, AZURE® cloud or internal corporate cloud computing clusters, or organizational computing resources, etc.

The computer system 1400 includes processor(s) 1402, such as a central processing unit, ASIC or other type of processing circuit, input/output devices 1412, such as a display, mouse keyboard, etc., a network interface 1404, such as a Local Area Network (LAN), a wireless 802.14x LAN, a 3G or 4G mobile WAN or a WiMax WAN, and a computer readable storage medium 1406. Each of these components may be operatively coupled to a bus 1408. The computer readable storage medium 1406 may be any suitable medium which participates in providing instructions to the processor(s) 1402 for execution. For example, the computer readable storage medium 1406 may be non-transitory or non-volatile medium, such as a magnetic disk or solid-state non-volatile memory or volatile medium such as RAM. The instructions or modules stored on the computer readable medium 1406 may include machine readable instructions 1464 executed by the processor(s) 1402 that cause the processor(s) 1402 to perform the methods and functions of the data processing system 100.

The data processing system 100 may be implemented as software stored on a non-transitory computer readable medium or machine-readable instructions executed by one or more processors. For example, the computer readable medium 1406 may store an operating system 1462, such as MAC OS, MS WINDOWS, UNIX, or LINUX, and code or machine readable instructions 1464 for the data processing system 100. The operating system 1462 may be multi-user, multiprocessing, multitasking, multithreading, real-time and the like. For example, during runtime, the operating system 1462 is running and the code for the data processing system 100 is executed by the processor(s) 1402.

The computer system 1400 may include a data storage 1410, which may include a non-transitory data storage. The data storage 1410 stores any data used by the data processing system 100. The data storage 1410 may be used to store real-time data associated with the processes executed by the data processing system 100 such as the new regulatory document, 150, the topics, entities, sections, etc.

The network interface 1404 connects the computer system 1400 to internal systems for example, via a LAN. Also, the network interface 1404 may connect the computer system 1400 to the Internet. For example, the computer system 1400 may connect to web browsers and other external applications and systems via the network interface 1404.

What has been described and illustrated herein is an example along with some of its variations. The terms, descriptions and figures used herein are set forth by way of illustration only and are not meant as limitations. Many variations are possible within the spirit and scope of the subject matter, which is intended to be defined by the following claims and their equivalents.

What is claimed is:

1. An Artificial Intelligence (AI)-based regulatory data processing system comprising:
   one or more processors; and
   a non-transitory data storage comprising processor-executable instructions that are executed by one or more processors to:
      receive a domain-specific document for analysis,
         the received domain-specific document including regulatory text associated with a specific domain;
      extract topics in the received domain-specific document using a topic extraction model, the topic extraction model being trained via unsupervised training on prior domain-specific documents from a regulatory text corpus, and the topic extraction model for identifying the topics from the received domain-specific document;

identify and classify one or more entities in the received domain-specific document by an entity identification model, the entity identification model being trained via supervised learning using the prior domain-specific documents;

classify one or more portions in the received domain-specific document as belonging to one of a plurality of predetermined sections by a section identification model, and the section identification model being trained via supervised learning on the prior domain-specific documents;

identify one or more actions to be executed for implementing processes by identifying the one or more sections as corresponding to requirements sections and the topics that include verbs extracted from the received domain-specific document;

obtain a corresponding priority for each of the one or more actions, the obtaining based at least on date entities determined from the one or more entities; and generate one or more notifications regarding the one or more actions and the corresponding priorities for each of the one or more actions.

2. The data processing system of claim 1, wherein the non-transitory data storage comprises further machine-readable instructions that are executed by the processor to:

access the regulatory text corpus that includes the prior domain-specific documents having regulatory information pertaining to the specific domain; and train the topic extraction model to extract the topics via unsupervised training on the prior domain-specific documents in the regulatory text corpus wherein the prior domain-specific documents include domain-specific topics.

3. The data processing system of claim 2, wherein the topic extraction model is based on Latent Semantic Indexing (LSI) with model parameters that include at least a number of topics, chunk size, and decay.

4. The data processing system of claim 1, wherein to identify and classify, the one or more entities in the received domain-specific document the processor is to:

extract linguistic features from the regulatory text of the received domain-specific document using an entity feature selection model based on sequence labelling with a selection method parameter set to select percentile and a scoring mode set to Chi-squared.

5. The data processing system of claim 4, wherein to identify and classify the one or more entities in the received domain-specific document the processor is to:

train the entity identification model to identify and classify domain-specific entities in the received domain-specific document via supervised training on the prior domain-specific documents in the regulatory text corpus, wherein the prior domain-specific documents include labelled training data identifying and classifying the domain-specific entities.

6. The data processing system of claim 5, wherein the entity identification model is based on conditional random fields (CRF) methodology.

7. The data processing system of claim 1, wherein to classify the one or more portions in the received domain-specific document the processor is to:

access the regulatory text corpus that includes the prior domain-specific documents having regulatory information pertaining to the specific domain; and train the section identification model to classify portions of the received domain-specific document under one of the plurality of predetermined sections via supervised training on the prior domain-specific documents in the regulatory text corpus, wherein the prior domain-specific documents include labelled training data with portions of the prior domain-specific documents annotated as being classified under one of the plurality of predetermined sections.

8. The data processing system of claim 7, wherein the section identification model is based on Multinomial Naïve Bayes methodology.

9. The data processing system of claim 1, wherein to notify the one or more users regarding the actions the processor is to:

automatically assign a team including the one or more users for implementing processes outlined in the regulatory text based at least on one or more of the sections and the topics.

10. The data processing system of claim 9, wherein to notify the one or more users regarding the actions the processor is to:

update a customized action board of each of the one or more users with a subset of the actions that each of the users is assigned, the action board being a portion of a dashboard user interface.

11. The data processing system of claim 9, wherein to notify the one or more users regarding the actions the processor is to:

generate individual email alerts to each of the one or more users individually wherein each individual email includes a subset of the actions that each of the users is assigned.

12. A method of processing domain-specific regulatory documents comprising:

accessing a domain-specific regulatory text corpus that includes prior domain-specific documents having regulatory information pertaining to a specific domain;

training a topic extraction model to extract one or more domain-specific topics via unsupervised learning on topic training data that includes the prior domain-specific documents in the regulatory text corpus wherein the prior domain-specific documents include domain-specific topics;

training an entity identification model to identify domain-specific entities via supervised learning on entity training data within the prior domain-specific documents in the regulatory text corpus wherein identifying the domain-specific entities includes identifying linguistic features in the prior domain-specific documents;

training a section classification model via supervised learning on section training data to classify portions of regulatory text into one of a plurality of predetermined sections wherein classifying the portions into one of the plurality of predetermined sections includes identifying linguistic features in the prior domain-specific documents;

identifying one or more of the topics and one or more of the domain-specific entities from a received domain-specific document including regulatory text using the trained topic extraction model and the trained entity identification model;

classifying one or more portions of the received domain-specific document into one of the plurality of predetermined sections using the trained section classification model;

automatically identifying one or more actions to be executed to implement regulations in the received domain-specific document based on verbs in the topics identified in the received domain-specific document; and notifying one or more users regarding the actions to be executed for implementing the regulations in the received domain-specific document.

13. The method of claim 12, wherein training the entity identification model via the supervised learning further comprises:

training the entity identification model for identifying the domain-specific entities via the supervised learning on the entity training data that includes a subset of the prior domain-specific documents annotated with the domain-specific entities wherein the entity identification model is based on conditional random fields (CRF) technique.

14. The method of claim 12, wherein training the section classification model via the supervised learning further comprises:

training the section classification model via the supervised learning on the section training data that includes a subset of the prior domain-specific documents wherein portions of each of the subset of the prior domain-specific documents are annotated as classified under one of the plurality of predetermined sections, wherein the section classification model is based on Multinomial Naïve Bayes (MNB) classification technique.

15. The method of claim 12, wherein identifying the domain-specific entities from the received regulatory text document using the entity identification model further comprises:

extracting linguistic features from textual content of the regulatory text document using a feature selection model based on sequence labelling technique.

16. The method of claim 12, wherein classifying the portions of the received regulatory text document further comprises:

extracting linguistic features from textual content of the regulatory text document using a section feature selection model based on classification technique.

17. A non-transitory processor-readable storage medium comprising machine-readable instructions that cause a processor to:

receive a domain-specific document for analysis, the received domain-specific document including regulatory text associated with a specific domain;

extract topics in the received domain-specific document using a topic extraction model, the topic extraction model being trained via unsupervised training on prior domain-specific documents in a regulatory text corpus for identifying the topics from the received domain-specific document;

identify and classify one or more entities in the received domain-specific document as belonging to entities by an entity identification model, the entity identification model being trained via supervised learning on the prior domain-specific documents;

classify one or more portions in the received domain-specific document as belonging to one of a plurality of predetermined sections by a section identification model, the section identification model being trained via supervised learning on the prior domain-specific documents;

identify one or more actions to be executed for implementing processes by identifying the one or more sections corresponding to requirements sections and the topics that include verbs extracted from the received domain-specific document;

obtain a corresponding priority for each of the one or more actions based at least on date entities determined from the one or more entities; and generate one or more notifications regarding the one or more actions and the corresponding priorities for each of the one or more actions.

18. The non-transitory processor-readable storage medium of claim 17 instructions that cause the processor to:

obtain from the topic extraction model, a subset of the prior domain-specific documents identified as relevant to the received domain-specific document;

estimate similarities between corresponding sections of each of the prior domain-specific documents and the domain-specific document; and compare the similarities to a similarity threshold.

19. The non-transitory processor-readable storage medium of claim 18, further comprising instructions that cause the processor to:

output via a graphical user interface (GUI) identities of one or more of the subset of the prior domain-specific documents that have corresponding sections that do not meet the similarity threshold.

* * * * *